No. 883,367. PATENTED MAR. 31, 1908.
F. M. WIDERMAN.
CUTTING MECHANISM FOR CORN HARVESTERS.
APPLICATION FILED JAN. 10, 1907.
2 SHEETS—SHEET 1.
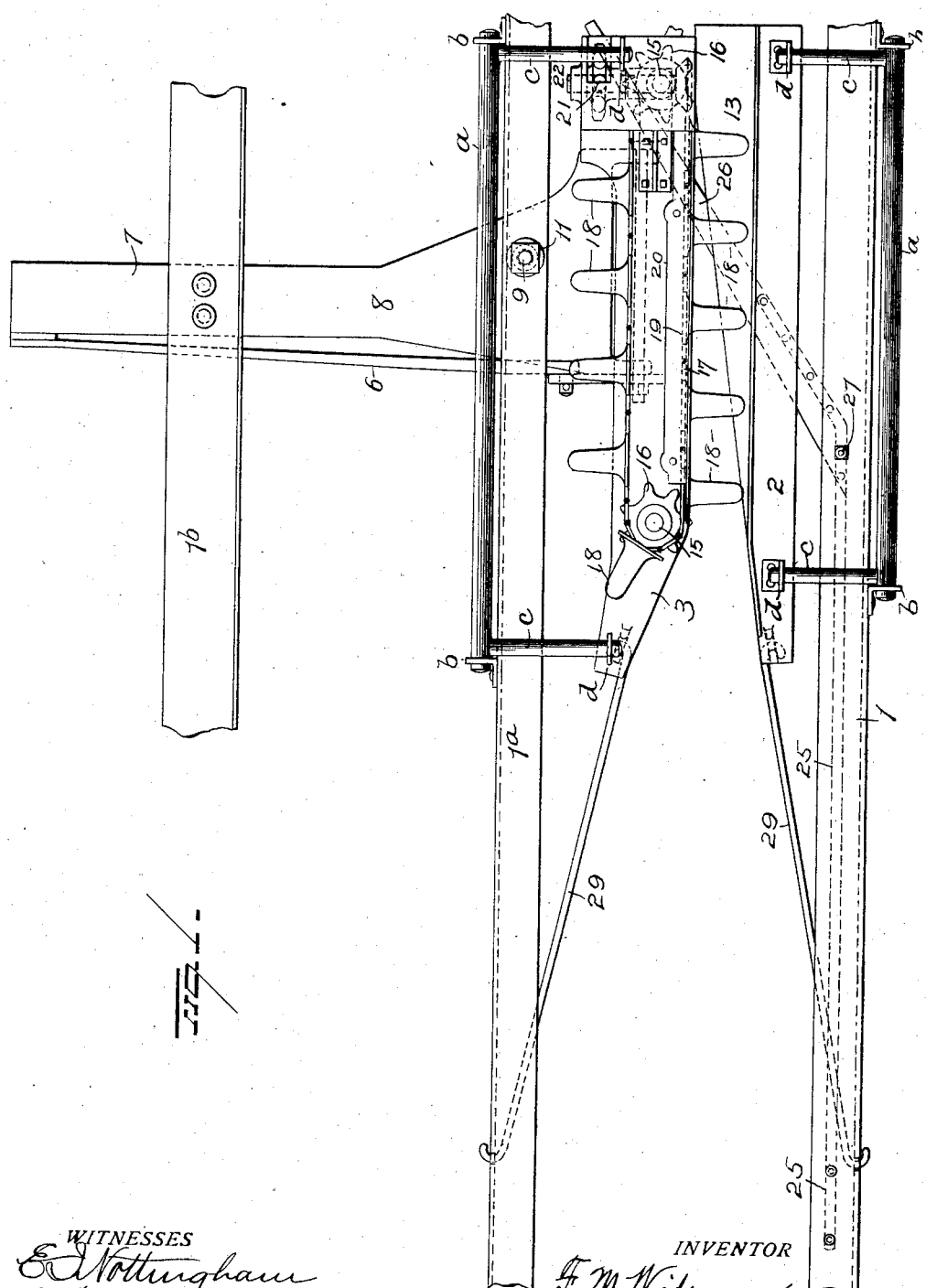
WITNESSES
INVENTOR

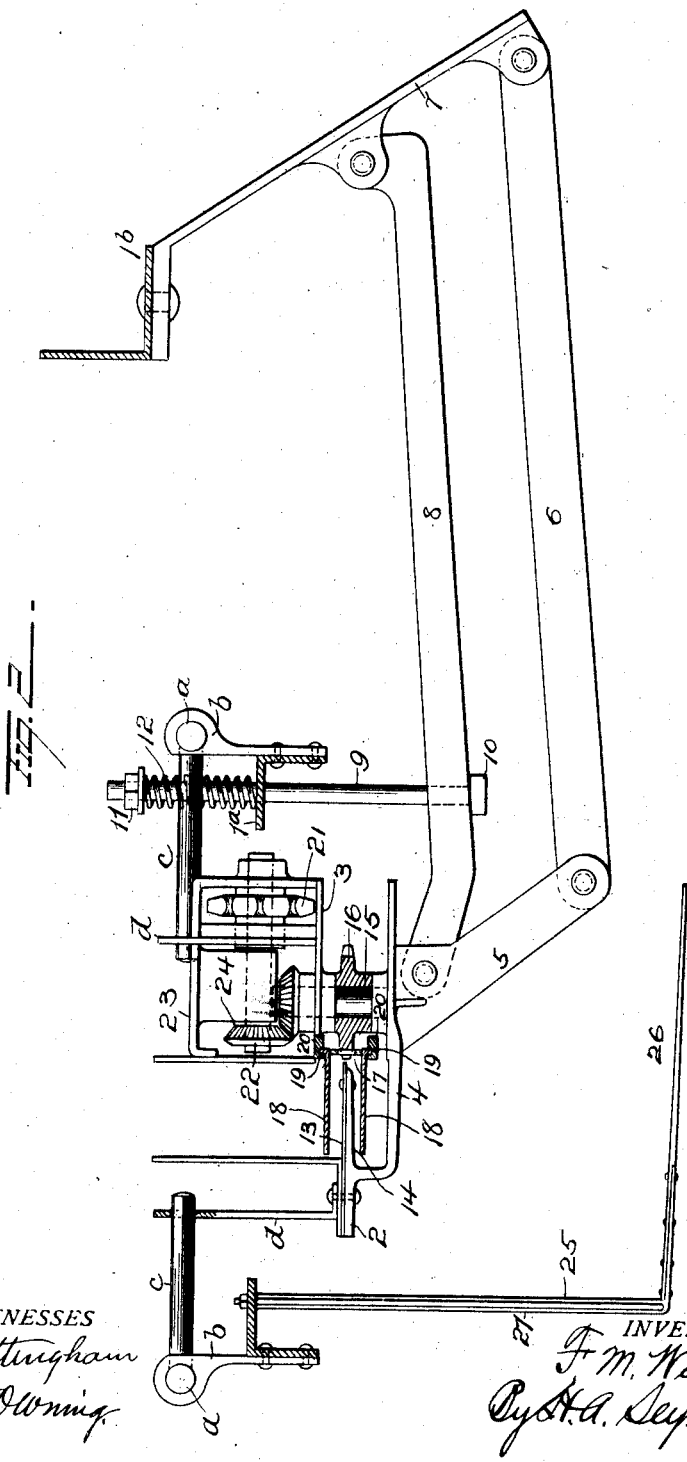

UNITED STATES PATENT OFFICE.

FRANCIS M. WIDERMAN, OF HARRISON, NEW JERSEY.

CUTTING MECHANISM FOR CORN-HARVESTERS.

No. 883,367.

Specification of Letters Patent.

Patented March 31, 1908.

Application filed January 10, 1907. Serial No. 351,720.

*To all whom it may concern:*

Be it known that I, FRANCIS M. WIDERMAN, a resident of Harrison, in the State of New Jersey, have invented certain new and useful Improvements in Cutting Mechanism for Corn-Harvesters; and I do hereby declare the following to be a full, clear, and exact description of the invention, such as will enable others skilled in the art to which it appertains to make and use the same.

My invention relates to improved cutting mechanism for corn harvesters, the object of the invention being to provide elastic supporting mechanism for the cutter and feeding devices which enables the cutter to completely sever a stalk of corn after starting without any vertical movement of the cutter, notwithstanding that rough ground may cause the harvester frame to move vertically.

A further object is to provide improved feeding devices for holding the stalks to the cutter blade and forcing them against the inclined cutting edge of the latter.

A further object is to provide an improved cutter to sever the stubble close to the ground.

With these and other objects in view, the invention consists in certain novel features of construction and combinations and arrangements of parts as will be more fully hereinafter described and pointed out in the claims.

In the accompanying drawings, Figure 1 is a plan view illustrating my improvements, and Fig. 2 is an end view partly in section.

1, $1^a$, and $1^b$, represent angle iron bars of the harvester frame, to which my improvements are connected, as will now be explained.

2, and 3, represent parallel bars of the cutter frame, the outside bar 2 having an extension plate 4 projecting beneath bar 3, secured thereto, and also secured to a bracket arm 5. The arm 5 is located at an angle, as shown in Fig. 2, and pivotally connected at its lower end to the outer end of link 6, the inner end of said link being pivotally secured to an inclined depending arm 7 secured to the harvester frame bar $1^b$. A heavy horizontal bar 8 is pivotally secured at its inner end to arm 7 and at its outer end supports the cutter frame and is pivotally secured to lugs on the bottom of plate 4. A bolt 9 is passed through this bar 8 and up through the bar $1^a$ of the harvester frame. The bolt 9 is made with a head 10 at its lower end below bar 8, and is screw threaded at its upper end to receive a nut 11, and a coiled spring 12 is located on bolt 9 above bar $1^a$ and between said bar and the nut 11, to permit the nut to adjust the cutter frame vertically and vary the tension of the spring.

To compel the bars 2 and 3, and all parts carried thereby, to always move up and down and prevent any tilting of the bars and cutter crank shafts $a$ are provided. These shafts $a$ have rotary mounting in bearings $b$ on bars 1 and $1^a$ respectively and are provided at their ends with crank arms $c$ projected through openings in upright lugs $d$ secured to bars 2 and 3. It will thus be seen that as the bars 2 and 3 are connected, as above pointed out, and as both bars, at their respective ends are connected with crank arms $c$ of shafts $a$, the front and rear ends of the bars must always move up and down at the same time and any tilting of the bars and cutter is absolutely prevented and the cutter is maintained in a horizontal position in its up and down movement.

13 represents the cutter blade, which is of tri-angular form having a diagonal cutting edge, and the blade is secured on cutter frame bar and supported at its rear end on a projection 14 on said bar 2.

Near the respective ends of bar 3, short vertical shafts 15 are located and have sprocket wheels 16 secured thereon and an endless sprocket chain 17 is mounted on these sprocket wheels 16 and carries improved fingers 18 to feed the stalks to the blade. The fingers 18 are arranged in two parallel series, so that one set of fingers will move below the blade and the other set above the blade, as shown in Fig. 2, and all the fingers have flanges or lips 19 at their inner ends movable through grooved guide bars 20 to prevent any pivotal or backward tilting of the fingers and hold them to their work.

The feeding fingers are driven by a sprocket wheel 21, connected by a chain (not shown) with the driving mechanism of the harvester. The sprocket wheel 21 is secured on a shaft 22 located in a housing 23 at one end of bar 3, and connected by beveled gears 24 with a shaft 15 to drive the sprocket chain 17 and feed the fingers rearward.

To prevent any rearward movement of the cutter frame, rods 29 are provided and are made with hooked ends to engage in openings in bars 1, 1ª, and in openings in the bars 2 and 3 and while these rods 29 will not interfere with the vertical movement of the cutter frame, they will prevent any rearward movement thereof.

Secured to the outside bar 1, is a long rearwardly extending spring rod 25 having its rear end inclined inward as shown and a long thin flexible blade 26 is secured to this inwardly bent end of the rod, and a long vertical bolt 27 is passed through the rod 25 at or near the point of its bend, to regulate the vertical position of the cutter 26. This blade or cutter 26 is to sever the stubble close to the ground and the flexibility of rod 25, and the cutter itself, together with the movement on bolt 27, enables the cutter to readily follow the contour of the ground and not be broken by movement of the harvester frame.

The operation of my improvements is as follows:—As the harvester is moved over the ground, it will take a rod of corn between the parallel bars 1, 1ª, and the fingers 18 will engage behind the stalks and hold them up to the inclined cutting edge of blade 13 to sever them, and upright plates 28 are preferably secured to the bars 2 and 3 to restrict the lateral movement of the stalks. Owing to the improved mounting for the cutter frame, as above explained, the frame is always maintained in a horizontal position regardless of the movement of the harvester frame, and it permits the harvester frame to move vertically without moving the cutter after the blade has entered a stalk, thus preventing any possibility of breaking the blade. The elastic mounting of the cutter frame will compensate for uneven ground over which the harvester travels, and the stubble cutter will likewise cut clear through a stalk after starting as its flexibility will permit the harvester frame to move vertically without injuring the stubble cutter.

A great many slight changes might be made in the general form and arrangement of the parts described without departing from my invention, and hence, I would have it understood that I do not restrict myself to the precise details set forth but consider myself at liberty to make such slight changes and alterations as fairly fall within the spirit and scope of my invention.

Having fully described my invention what I claim as new and desire to secure by Letters-Patent, is:—

1. In a cutting mechanism for corn harvesters, the combination with a frame, two series of fingers disposed in different horizontal planes, and means for supporting said fingers and moving both series simultaneously in the same direction, of a cutting blade secured to said frame and disposed in a plane between the two series of fingers, said blade having a cutting edge disposed diagonally with respect to the direction of movement of the two series of fingers.

2. In a cutting mechanism for corn harvesters, the combination with a harvester frame, of a vertically movable elastically supported cutting frame, a cutting blade on said frame, an endless chain, and fingers on the chain movable in paths above and below the cutter.

3. In a cutting mechanism for corn harvesters, the combination with a harvester frame, of a vertically movable elastically supported cutter frame, a blade secured on said cutter frame, an endless chain, parallel feeding fingers on the chain straddling the blade, said blade having a cutting edge disposed diagonally to the path of movement of said fingers.

4. In a cutting mechanism for corn harvesters, the combination with a harvester frame, of a vertically movable elastically supported cutter frame, a blade secured on the cutter frame, an endless chain on the cutter frame, parallel fingers on the chain straddling the blade said blade having a cutting edge disposed diagonally to the path of movement of said fingers, and guide bars holding the fingers against tilting movement.

5. In a cutting mechanism for corn harvesters, the combination with a harvester frame, of a vertically movable elastically supported cutter frame, a blade secured on the cutter frame, an endless chain on the cutter frame, parallel fingers on the chain straddling the blade, said blade having a cutting edge disposed diagonally to the path of movement of said fingers, flanges or lips on the inner ends of the fingers, and grooved guide bars to receive the flanges or lips and hold the fingers against backward tilting.

6. In a cutting mechanism for corn harvesters, the combination with a harvester frame, of a vertically movable elastically supported cutter frame, a blade secured on the cutter frame, an endless chain on the cutter frame, parallel fingers on the endless chain straddling the blade, said blade having a cutting edge disposed diagonally to the path of movement of said fingers, flanges or lips on the inner ends of the fingers, grooved guide bars to receive the flanges or lips and hold the fingers against tilting, and rods connecting the forward ends of the cutter frame with the harvester frame to prevent any rearward movement of the cutter frame.

7. In a cutting mechanism for corn harvesters, the combination with a harvester frame, and a cutter frame, of depending arms fixed to the harvester frame and cutter frame respectively parallel horizontal bars or links pivotally connecting said arms, a vertical bolt passed through one of said bars or links and a bar of the harvester frame, a nut on the upper end of the bolt, and a spring on the bolt between the nut and bar of the harvester frame.

8. In a cutting mechanism for corn harvesters, the combination with a harvester frame, and a cutter frame, of inclined arms fixed to the harvester frame and the cutter frame respectively, parallel horizontal bars or links pivotally connecting the said arms, a vertical bolt passed through one of said bars or links and through one of the bars of the harvester frame, a nut screwed onto the upper end of the bolt above the harvester frame, a spring on the bolt between the nut and harvester frame, a cutting blade on the cutter frame, and feeding fingers to feed the stalks against said blade to sever them.

9. In a cutting mechanism for corn harvesters, the combination with a harvester frame, a cutter frame supported thereby, and mechanism on the cutter frame for severing the stalks some distance from the ground, of a long rod secured to the harvester frame, a long thin stubble cutting blade secured to the rear end of the rod and having its cutting edge located in a vertical plane at an acute angle to the longitudinal axis of the cutter frame and a vertical bolt connecting the rear portion of the rod with the frame above.

10. In a cutting mechanism for harvesters, the combination with bars, and a cutter supported thereby, of crank shafts, and lugs on the bars connected with the arms of the crank shafts.

11. In a cutting mechanism for harvesters, the combination with parallel bars, a frame connecting them, a cutter carried by one bar and fingers movable on the other bar to hold the stalks up to the cutter, of an elastic support for the bars, crank shafts above the bars, and lugs on the bars having openings to receive the arms of the crank shafts.

12. In a cutting mechanism for corn harvesters, the combination with parallel bars, a frame connecting them, a cutter carried by one bar, an endless chain carried by the other bar and fingers on the chain to feed the stalks to the cutter, of a spring elastically supporting the bars, horizontal crank shafts above the bars having approximately horizontal crank arms, and lugs near the ends of the bars having openings to receive the crank arms.

In testimony whereof, I have signed this specification in the presence of two subscribing witnesses.

FRANCIS M. WIDERMAN.

Witnesses:
S. W. FOSTER,
R. S. FERGUSON.